United States Patent
Shivanna et al.

(10) Patent No.: US 10,956,143 B2
(45) Date of Patent: Mar. 23, 2021

(54) SERVER UPDATES

(71) Applicant: HEWLETT PACKARD ENTERPRISE DEVELOPMENT LP, Houston, TX (US)

(72) Inventors: Suhas Shivanna, Bangalore (IN); John Harsany, Houston, TX (US); Peter Hansen, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 225 days.

(21) Appl. No.: 15/833,666

(22) Filed: Dec. 6, 2017

(65) Prior Publication Data

US 2019/0171436 A1 Jun. 6, 2019

(51) Int. Cl.
 *G06F 8/65* (2018.01)
(52) U.S. Cl.
 CPC ..................... *G06F 8/65* (2013.01)
(58) Field of Classification Search
 CPC .......................................... G06F 8/65
 See application file for complete search history.

(56) References Cited

U.S. PATENT DOCUMENTS

| | | | | |
|---|---|---|---|---|
| 7,287,253 B2 * | 10/2007 | Yamamura | ................ | G06F 8/61 717/121 |
| 7,590,835 B1 * | 9/2009 | Nallagatla | .......... | G06F 9/44505 710/8 |
| 7,823,147 B2 | 10/2010 | Moshir | | |
| 7,996,829 B2 * | 8/2011 | Depew | ...................... | G06F 8/65 717/168 |
| 8,458,310 B1 | 6/2013 | Mayor | | |
| 8,522,233 B2 | 8/2013 | Nakamura | | |

(Continued)

FOREIGN PATENT DOCUMENTS

WO 02/25438 A1 3/2002

OTHER PUBLICATIONS

International Standard, "Information Technology—Software Asset Management" Part 1: Processes, First Edition, May 1, 2006, 32 pages.

(Continued)

*Primary Examiner* — Douglas M Slachta
(74) *Attorney, Agent, or Firm* — Hewlett Packard Enterprise Patent Department

(57) ABSTRACT

A method disclosed herein relates to determining an inventory of a plurality of servers based on unique fingerprints and common fingerprints; creating a common set of installed firmware and a plurality of unique sets of installed firmware based on the inventory of the plurality of servers; creating subcategory sets of installed firmware based on the common set of installed firmware and categories of components included in the plurality of servers; obtaining updated versions of firmware corresponding to the subcategory sets of installed firmware and the unique sets of installed firmware; in response to an update request, creating containers for the updated versions of firmware corresponding to the subcategory sets of the installed firmware and the unique sets of installed firmware; and sending update messages to the plurality of servers including links to the respective containers.

20 Claims, 3 Drawing Sheets

(56) References Cited

U.S. PATENT DOCUMENTS

| | | | | |
|---|---|---|---|---|
| 8,732,829 | B2* | 5/2014 | Johnson | G06F 21/552 |
| | | | | 726/2 |
| 8,843,771 | B2* | 9/2014 | Wang | H04L 41/00 |
| | | | | 700/299 |
| 8,972,973 | B2* | 3/2015 | Cavalaris | G06F 8/654 |
| | | | | 717/172 |
| 9,015,694 | B2 | 4/2015 | Gray et al. | |
| 9,032,053 | B2* | 5/2015 | Kosuru | H04L 41/082 |
| | | | | 709/221 |
| 9,395,968 | B1* | 7/2016 | Nallagatla | G06F 8/654 |
| 9,461,969 | B2* | 10/2016 | Watt | H04L 63/0272 |
| 9,665,366 | B2 | 5/2017 | Kuchibhotla | |
| 10,331,428 | B1* | 6/2019 | Zalpuri | G06F 8/65 |
| 10,756,974 | B2* | 8/2020 | Malaspina | H04L 41/0843 |
| 2005/0132349 | A1* | 6/2005 | Roberts | G06F 8/65 |
| | | | | 717/168 |
| 2006/0136710 | A1* | 6/2006 | Oka | G06F 8/65 |
| | | | | 713/100 |
| 2006/0253617 | A1* | 11/2006 | Lin | G06F 9/4411 |
| | | | | 710/8 |
| 2007/0130481 | A1* | 6/2007 | Takahashi | G06F 21/41 |
| | | | | 713/300 |
| 2008/0028385 | A1* | 1/2008 | Brown | G06F 8/65 |
| | | | | 717/170 |
| 2008/0189693 | A1* | 8/2008 | Pathak | H04L 67/125 |
| | | | | 717/168 |
| 2009/0037904 | A1* | 2/2009 | Cohen | G06F 8/65 |
| | | | | 717/175 |
| 2012/0054733 | A1 | 3/2012 | Vidal et al. | |
| 2012/0062948 | A1* | 3/2012 | Nishikawa | H04N 1/00408 |
| | | | | 358/1.15 |
| 2013/0138783 | A1* | 5/2013 | Mallur | G06F 8/65 |
| | | | | 709/221 |
| 2013/0185405 | A1* | 7/2013 | Amin | H04L 41/04 |
| | | | | 709/223 |
| 2014/0007069 | A1* | 1/2014 | Cavalaris | G06F 8/654 |
| | | | | 717/170 |
| 2014/0173328 | A1* | 6/2014 | Dasari | G06F 11/0736 |
| | | | | 714/2 |
| 2015/0149989 | A1* | 5/2015 | Lu | G06F 8/658 |
| | | | | 717/170 |
| 2016/0026449 | A1 | 1/2016 | Gierlak et al. | |
| 2017/0180987 | A1* | 6/2017 | Tung | H04L 9/3234 |
| 2017/0220404 | A1* | 8/2017 | Polar Seminario | G06F 11/0736 |
| 2017/0279672 | A1* | 9/2017 | Krishnan | H04L 41/0803 |
| 2017/0315798 | A1* | 11/2017 | Shivanna | G06F 8/654 |
| 2017/0322796 | A1* | 11/2017 | Kim | G06F 8/654 |
| 2018/0165455 | A1* | 6/2018 | Liguori | G06F 21/575 |

OTHER PUBLICATIONS

S, Santhosh "Automatic/Scalable Firmware and System Software update on Datacenter Products like Server, Storage and Network devices," (Research Paper), Jul. 11, 2017, 6 pages.

* cited by examiner

SERVER UPDATES

BACKGROUND

Updating large sets of servers takes large amounts of planning and time. Determining inventory and install sets takes time and deploying firmware updates simultaneously to a large number of servers may create network bottlenecks.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
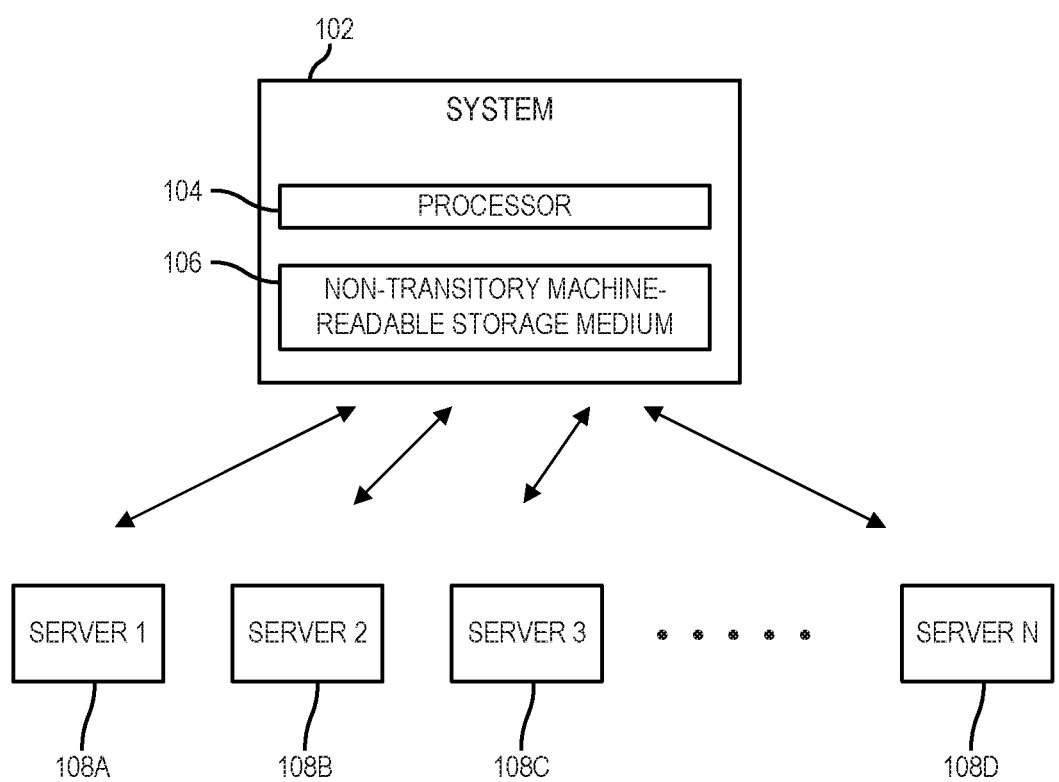
FIG. 1 is a block diagram of a plurality of servers and a system including a processor capable to take an inventory of a plurality of servers, create fingerprints, and create and deploy firmware install sets, according to one example.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Updating large sets of servers takes large amounts of planning and time. Determining inventory and install sets takes time and deploying firmware updates simultaneously to a large number of servers may create network bottlenecks.

Examples described herein may utilize a centralized group of servers, a management server, a remote management computing device, or the like. Any of the computing devices mentioned previously, such as a management server, may gather an inventory of a plurality of servers. The computing devices mentioned (e.g., a management server) may gather the inventory of the plurality of servers based on a fingerprint of each server of the plurality of servers. As noted, each server of the plurality of servers may have an associated fingerprint. The fingerprint for each server may be generated by each of the servers in the plurality of servers itself. The fingerprint may be associated with a list of the components of the server, the type or model of server, a list of each of the server's firmware, as well as any other applications or drivers of the server. Many of the plurality of servers may have the same fingerprint (as in, a shared or common fingerprint). In such examples, those servers may be grouped together and an inventory taken once for the entire group of servers sharing the same (e.g. common) fingerprint. In an example, thousands or tens of thousands of servers may share the same configuration. The servers may share the same or a common fingerprint, based on each server's configuration. Rather than taking an inventory of each server, inventory may be taken once for all servers. Other servers of the plurality of servers may have unique fingerprints, or potentially a combination of common fingerprints and unique fingerprints.

After inventory of the plurality of servers, whether based on fingerprints or not based on fingerprints, the computing devices mentioned previously (e.g., management server) may generate a list of firmware updates. Stated another way, the management server may generate an install set per common or shared inventories and per unique inventories. In another example, the common inventory may be broken up into subcategories, based on various factors. After install set generation, the computing devices mentioned previously (e.g., management server) may deploy containers. The containers may store each generated install set. The computing devices mentioned previously (e.g., management server) may strategically deploy the containers based on various conditions and factors. In other words, the computing devices mentioned previously (e.g., management server) may deploy the containers based on location of the servers to be updated, the amount of firmware components in the install set, the deployment requirements, and various other factors. After container deployment, the computing devices mentioned previously (e.g., management server) may signal or notify the plurality of servers to update. The computing devices mentioned previously (e.g., management server) may signal or notify specific servers to update based on various factors as well.

Accordingly, various examples provided herein determine an inventory of a plurality of servers based on unique fingerprints and common fingerprints. The examples include creating a common set of installed firmware and a plurality of unique sets of installed firmware based on the inventory of the servers. The example also includes creating subcategory sets of installed firmware based on the common set of installed firmware and categories of components included in the plurality of servers. The examples also include obtaining versions of firmware corresponding to the subcategory sets of installed firmware and the unique sets of installed firmware. In response to an update request, examples include creating containers for the updated versions of firmware corresponding to the subcategory sets of the installed firmware and the unique sets of installed firmware. Examples also include sending update messages to the plurality of servers including links to the respective containers.

As shown in FIG. 1, a system 102 may include a processor 104 and non-transitory machine-readable storage medium 106. The system 102 may be comprised of one or more computing devices. The computing devices may include one or more processing resources and non-transitory machine-readable storage medium. The non-transitory machine-readable storage medium 106 may include machine-readable instructions that may be executed by the processing resource. The system 102 may connect to multiple servers 108 or other computing devices, over an intranet, internet, management network, some other type of connection, or a combination thereof. The servers 108 or computing devices may contain multiple components, such processing resources, non-transitory machine-readable storage medium, management components, input output (I/O) cards, and other peripherals. The referenced, but not limited to, components may include associated firmware and drivers (in other words, specific firmware and drivers may be associated with a specific component). The servers 108 or other computing devices may include other applications or utilities, such as agents or array configuration utilities. The firmware, drivers, and other applications may update at regular and/or irregular intervals. The firmware, drivers, and other applications may include requirements when installed such as system restart, recommended system restart, an order of update (as in, one component is dependent on another component to be installed), and other factors.

As used herein, a "computing device" may be a storage array, storage device, storage enclosure, server, desktop or laptop computer, computer cluster, node, partition, virtual machine, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, a "Baseboard Management Controller" or "BMC" is a specialized service processor that monitors the physical state of a server or other hardware using sensors and communicates with a management system through an independent "out-of-band" connection. The BMC may also communicate with applications executing at the OS level through an IOCTL interface driver or a Representational state transfer (REST) application program interface (API). The BMC may have hardware level access to hardware devices located in a server chassis. The BMC may be able to directly modify the hardware devices. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for subsystems of a computing device, and is separate from a processing resource that executes an OS of a computing device. The BMC is separate from a processor, such as a central processing unit, executing a high level operating system or hypervisor on a system, for example each individual server 108*a*-108*n*.

As used herein, a "container" is a virtualization method for deploying and running distributed applications without launching an entire virtual machine for each application. Multiple containers can run on the same computing device and share the same OS kernel. Each container may run as an isolated process in the user space, rather than running as a full OS. In an example, the containers may store machine readable instructions. In a further example, the machine readable instructions may include firmware, drivers, and other applications to be installed on other systems. In another example, the container may be a stateless container. In another example, the container may be a just in time container. In another example, system described above may include machine readable instructions to create containers dynamically. In such examples, the containers may be created at any time and on strategically determined servers. The system may utilize factors to determine where to create the container, such as the size of the firmware, where the servers to be updated are located, the amount of servers to be located, or some combination thereof.

As used herein, a "fingerprint" may be a string of bits that identify a computing device. A computing device may generate a fingerprint based on the components of the computing device, firmware installed on the computing device, and other factors. As used herein, a "unique fingerprint" may be a fingerprint for a limited amount of computing devices, as in only one, a few, or a small amount of computing devices or components may be associated with one unique fingerprint. As used herein, a "common fingerprint" may be common. For example, the common fingerprint may be associated with many computing devices.

As used herein, an "install set" may be a group of firmware, drivers, other applications, utilities, or a combination thereof. The group may be associated with a set of components. In other words, a group may include firmware updates, driver updates, application updates, utility updates, or some combination thereof for a component or set of components. A unique install set may be an install set that includes updates for one server or a limited or small set of servers. A common or shared install set may be an install set that includes updates for a wide or large set of servers. In an example, one server out of ten thousand may include a graphics card. An install set for such a server may include graphics card firmware. Such an install set may be considered a unique install set (or unique set). In another example, all servers in a group of ten thousand servers may include a BMC. An install set for all servers may include BMC firmware. Such an install set may be considered a common or shared install set (or common set).

Figure 2:
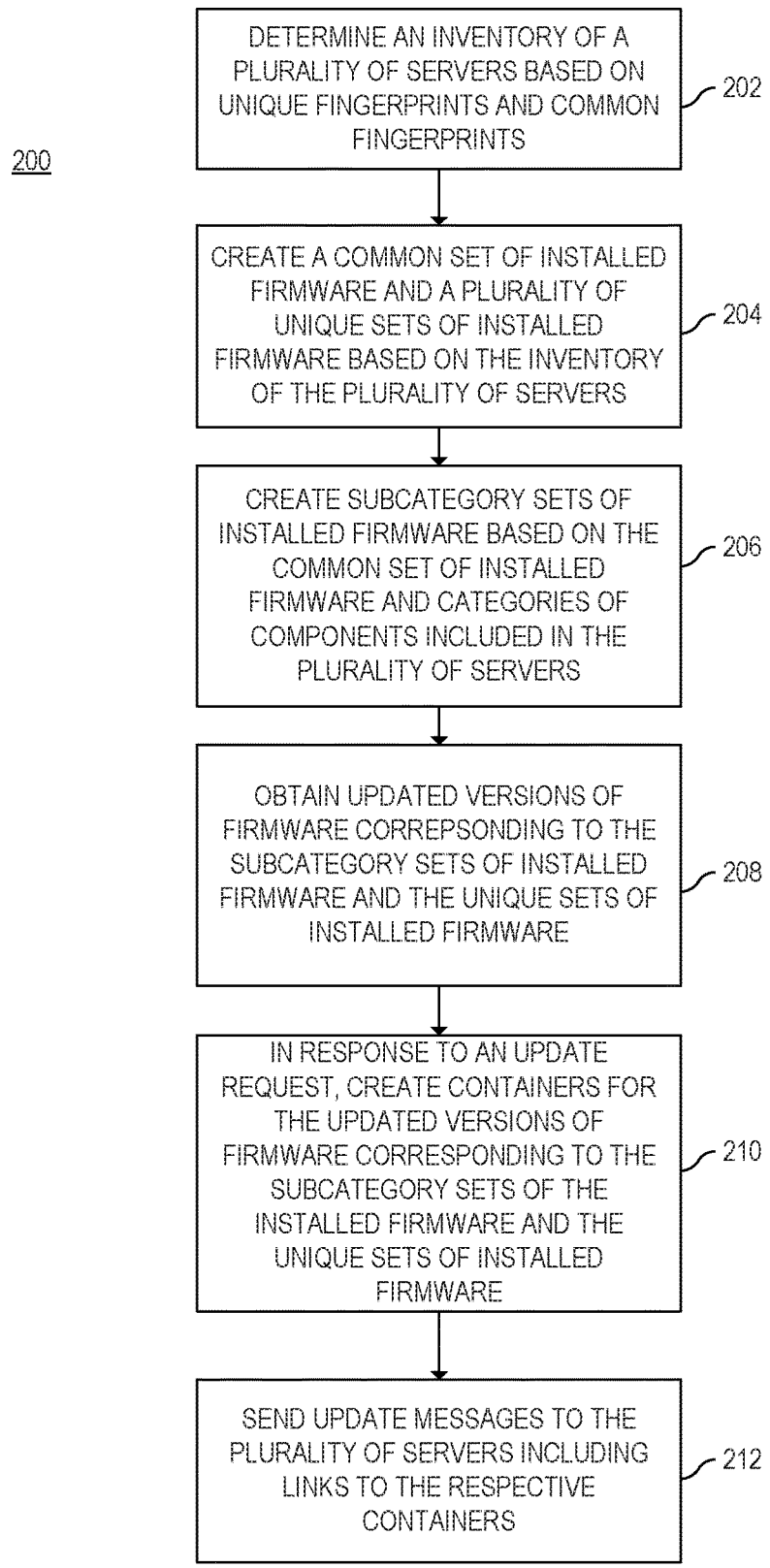
FIG. 2 is a flowchart of a method for determining an inventory of a plurality of servers, creating install sets, obtaining updates, and deploying the updates via containers.

FIG. 2 is a flowchart of a method for determining an inventory of a plurality of servers, creating install sets, obtaining updates, and deploying the updates via containers. Although execution of method 200 is described below with reference to the system 102 of FIG. 1, other suitable systems or modules may be utilized. Additionally, implementation of method 200 is not limited to such examples.

At block 202, system 102 may determine an inventory of a plurality of servers 108 based on unique fingerprints and common fingerprints of the plurality of servers 108. The system 102 may scan a server to determine its inventory. After a server is scanned, the system 102 may move to the next server. If the next server has the same fingerprint (unique or common), then the system 102 may not scan the next server. Each server (as in, server 1 108A, server 2 108*6*, server 3 108C, and up to server N 108D) of the plurality of servers 108 may include a unique fingerprint, a common fingerprint, or some combination thereof. Each server of the plurality of servers 108 may include multiple common fingerprints and/or unique fingerprints. Each server of the plurality of servers 108 may create the unique fingerprint and/or common fingerprint. In another example, each server of the plurality of servers 108 may not include a unique fingerprint or common fingerprint. In such examples, system 102 may take the inventory of the plurality of servers 108 and then create corresponding fingerprints, both unique and common. Further, after the fingerprints are created, the system 102 may store the corresponding fingerprints and a server identification in the systems 102 machine-readable storage medium 106, as well as storing a specific server's fingerprint in the specific server's machine-readable storage medium. In another example, a server's machine-readable storage medium may include the instructions to create fingerprints, both unique and common. In such examples, the server may execute the instructions to create a fingerprint upon boot, upon a prompt, or at some specified time. In a further example, the system 102 may send the prompt to the plurality of servers 108 to create the fingerprint. Each server of the plurality of servers 108 may store the unique fingerprint and/or the common fingerprint associated in the server's machine-readable storage medium.

In an example, the inventory, determined by system 102, may be a list of components, firmware utilized by the components, the version of the firmware, and the associated server. In another example, other information may be included in the inventory. For example, the inventory may include the fingerprint associated with the component and firmware. In another example, the inventory may include a list of the servers associated with a fingerprint, unique and/or common. In another example, the system 102 may store the inventory in the machine readable storage medium. The inventory may be stored in a Java script object notation (JSON) format, database file format, extensible markup language (XML) format, spreadsheet format, or some other similar format that offers easy human and machine readability.

At block 204, system 102 may create a common set of installed firmware and a plurality of unique sets of installed firmware based on the inventory of the plurality of servers 108. In response to completion of the inventory of the plurality of servers 108, the system 102 may create sets of installed firmware. The system 102 may create a plurality of unique sets of installed firmware and a common set of installed firmware. The common set of installed firmware includes firmware that is common across multiple servers. The common set may associate with a larger amount of servers than the plurality of unique sets. In an example, the common set of installed firmware and unique sets of installed firmware may be lists of the firmware installed on the servers. The list may include the version of the firmware. In another example, the version of firmware installed in the common sets may be the same across all servers associated with that common set. In another example, the system 102 stores the common set of installed firmware and the unique sets of installed firmware in the machine-readable storage medium 106. In another example, the common set of installed firmware and the unique sets of installed firmware may include the firmware components or firmware packages. In such examples, the system may store the firmware for the common set of installed firmware and the unique sets of installed firmware as known good sets of firmware. In the example that corrupted or comprised firmware is detected on a server of the plurality of servers 108, the system 102 may deploy the last known good version of firmware to the affected server. In other words, the system 102 may roll back the firmware to this last known good set.

At block 206, the system 102 may create subcategory sets of the common set of installed firmware. In other words, the system 102 may subcategorize the common set of installed firmware. In an example, the subcategorization may be based on the type of firmware and/or the component associated with the firmware. For example, subcategories may include BMC firmware, programmable interface controller (PIC) firmware, I/O firmware, core system firmware (such as BIOS, unified extensible firmware interface (UEFI), or the like), hard disk drive (HDD) firmware, solid state drive (SSD) firmware, non-volatile memory express (NVMe) firmware, management engine (ME) firmware, or the like. In another example, the inventory and install sets may include drivers and various other applications, such as agents and utilities. In such examples, the drivers and other applications may be common across all servers. In such cases, the subcategories may include agents, utilities (such as diagnostics or array configuration), and drivers (per device). In another example, the system may take other factors into account when determining subcategories. For example, the system may consider whether a specific firmware has a dependency on another firmware. In such examples, the specific firmware may be grouped with the firmware that the specific firmware is dependent on. In another example, firmware that may result in a system restart may be grouped together. The system 102 may consider other factors when creating subcategories.

At block 208, the system 102 may obtain updated versions of firmware corresponding to the subcategory sets of installed firmware and the unique sets of installed firmware. In other words, the system 102 may obtain updated versions of the installed firmware of the plurality of servers 108. In an example, the system 102 may obtain the firmware updates automatically through a web server. In another example, a user may provide the firmware updates to the system 102. In another example, the firmware updates may be obtained through a link to a web page. In such examples, many firmware updates may be included in a pack. The pack may include many firmware updates, some firmware updates not associated with the plurality of servers 108. In another example, firmware updates may be made available at regular intervals. In another example, off interval or one off firmware updates may also be made available at any time. In another example, as the system 102 obtains the firmware updates, the system 102 may save the updates to the machine-readable storage medium 106. The firmware updates may be in a compressed state due to size. The system 102 may decompress the updates and store the actual firmware updates in the machine-readable storage medium 106.

At block 210, in response to an update request, the system 102 may create containers for the updated versions of the firmware corresponding to the subcategory sets of the installed firmware and the unique sets of the installed firmware. In an example, the update request may be set or scheduled for regular intervals. In another example, a user may prompt the update request. In another example, the update request is prompted by an event. The event may include new firmware update availability, issues caused by firmware updates, new components added to a server, new servers added to the plurality of servers 108, and other scenarios. In another example, rather than creating containers for updated versions of firmware, the system 102 may create containers for prior versions of firmware and the request may be to downgrade to the prior versions of firmware. In another example, the system 102 utilizes an application stored in the machine-readable storage medium 106 and executed by the processor 104 to create containers. In another example, the system 102 deploys each container created to one of the plurality of servers. In such examples, the server that hosts a container is determined based on location to servers to be updated, network topology, server workload, and the size of the firmware updates. For example, if a group of servers of the plurality of servers 108 share a common fingerprint, utilize the same firmware updates, and are located in the same data center, then the system 102 may choose a server from that group of servers to host a container that contains the firmware updates for that group of servers. In another example, a container stores the firmware associated with a particular common set of installed firmware, unique set of installed firmware, or subcategory set of installed firmware. In another example, a container may store firmware associated with more than one set of installed firmware, depending on various factors similar to those mentioned in the example of above.

At block 212, the system 102 may send an update message to the plurality of servers 108, the message including links to the respective containers. In an example, the system 102 may send updates to servers of the plurality of servers 108 based on various factors. In such examples, factors may include how many servers may be updated, where the servers are located, how many servers per container, and any other unique aspects of the firmware update process (as in, does the firmware installation process include a system restart or do the firmware updates include dependencies on other firmware updates). In another example, the system 102 may stage the update signals based on the plurality of servers' topology or network topology to prevent bottlenecks.

In another example, the system 102 may include instructions to send notifications in response to a server of the plurality of servers 108 changing. In such examples, a component may be added to a server. In such examples, the server may send a notification over a management network or some other network connection to the system 102 to notify the system 102 that a new component has been added. The system 102 may take actions in such examples. Further, the respective server's BMC may send the notification. In another example, a respective server's BMC may send a signal over a management network if firmware or other applications are updated without a prompt from the system 102. In such examples, the system 102 may take corrective action by downgrading the updated firmware or other application to the last known good firmware or other application, respectively. In another example, a respective server's BMC may send a signal to the system 102 upon a chassis intrusion. In another example, upon reception of a notification by the system 102, the system 102 may take corrective actions and/or send notifications to users or administrators.

As noted above, FIG. 1 illustrates an example of a system 102 including a processor 104 and machine-readable storage medium 106, as well as a plurality of servers 108 in communication with the system 102. In an example, the system 102 is a management station, a single management server, a remote management computing device or application, multiple servers running a management application, or some other system capable of managing a plurality of servers 108.

In an example, the system 102 includes a processor 104 to take an inventory of a plurality of servers 108. In such examples, the system 102 may take an inventory based on a plurality of fingerprints, both unique and common. In another example, the system 102 may take an inventory by scanning the each of the plurality of servers 108 and recording the components of the plurality of servers 108, the firmware associated with the components of a server, and the version of the firmware installed. In an example, the inventory may include a list of the firmware components, as well as the version, and the server associated with the firmware component and the component (as in, the hardware of the server). The inventory may include other information.

In an example, the plurality of servers 108 may not include fingerprints. In such examples, the system 102 may create fingerprints based on the inventories taken from the plurality of servers 108. The fingerprints created may include a common fingerprint and unique fingerprints. The common fingerprint may include common components across multiple servers of the plurality of servers 108. In other words, servers in a data center may be composed of many of the same type or model of server. In some examples, these servers may all have the same component types. Thus, once an inventory is taken, if a server has the same fingerprint, an inventory may not be taken for any other server with the same fingerprint again. For instance, if one thousand servers have the same fingerprint, then one inventory of the thousand servers may be taken. In an example where the servers 108 do not include fingerprints, the system 102 or servers 108 may create a fingerprint. Each server may include an application to create a fingerprint when prompted (for example, by the system 102), upon boot, or at some predetermined time. Each server may create a fingerprint based on components in the server, firmware installed on the server, and various other factors. Once the fingerprints are created, the system 102 may take inventory of the plurality of servers. The system 102 may take an inventory of a server with a particular fingerprint and if the system 102 reaches another server with the same fingerprint, then the system 102 may not take an inventory of the other server, as the fact that the fingerprints are the same may establish that the servers have the same inventory. A number of servers of the plurality of servers 108 may include unique components, such as unique PCI cards, graphics cards, or other peripheral cards or drives. In such examples and as described above, the system 102 or the server may create a unique fingerprint. The unique fingerprint may be shared by several servers, but not on the same scale as servers that share the common fingerprint.

In another example, the processor creates install sets based on the inventory taken, which may be based on the unique fingerprints and common fingerprints. The install set may include a servers currently installed firmware components. The system 102 may store the firmware components as a backup to newly installed firmware components on the plurality of servers 108. The backup may ensure a last known good state of firmware. The backup may protect the servers from bad firmware updates, potential corruptions, and potential security threats. The system 102 may also create install sets based on updates to the currently installed firmware on the plurality of servers 108. In such examples, the install sets may be based on updates available, as well as the inventories taken based on unique fingerprints and common fingerprints of the plurality of servers 108. In an example, the system 102 stores the install sets utilized by the system 102 as a backup after the updates are installed in the plurality of servers 108.

In another example, the processor 104 may stage the install sets for installation on the plurality of servers 108. The system 102 may stage the install sets in an order based in part on the fingerprint, the plurality of unique fingerprints, the topology of the servers, type of firmware or software to be installed, the size of the updates, the amount of servers to be updated, whether the updates may have downtime associated with the updates, whether the updates have special update instructions, or some combination thereof.

In another example, once the updates are staged, the system 102 may deploy the install sets. In an example, the system 102 may deploy the install sets to containers created by the system 102. In a further example, various servers of the plurality of server 108 may host the containers. In another example, the various servers that the containers may be hosted on are determined based in part on server topology, network topology, the amount of servers to be updated, the size of the containers, and the update instructions. In an example, each server of the plurality of servers 108 may include applications to host containers. In another example, the system 102 may include an application to create containers.

Once the install sets are computed and deployed, the system 102 may send an update notification. In an example, the notification may include a link to the respective container. In an example, the system 102 may send the update notification over a management network to a BMC of a server or servers of the plurality of servers 108. In a further example, the BMC of a server of the plurality of servers 108 performs the installation or update of the firmware associated with the server. Each server that is sent the update signal or update notification may perform update operations.

In another example, a server of the plurality of server 108 may send a notification to the system 102 upon a physical change of the server. For example, if a component is added to or removed from a server, the fingerprint for that server may be altered. The server may notify the system 102 that the server has changed and the system 102 may note the fingerprint for that server, update the inventory for that server, and then update the fingerprint for that server (or create a new fingerprint in addition to any other fingerprints associated with the server).

In another example and as described above, the system 102 may receive security notifications. A server of the plurality of servers 108 may send the security notifications to the system 102. For example, if a server experiences a security event, the BMC of the server may notify the system 102. In response to the reception of a notification, the system 102 may take corrective action. In an example a security event may include a hardware change, firmware change, software change, unauthorized access, physical intrusion, or some other anomaly. In another example, corrective action may include firmware rollback, firmware updates, software rollback, software update, server isolation, server shutdown, user notification, administrator notification, and/or application notification.

In another example, the plurality of servers 108 may include a large set of servers or computing devices. For example, the set of servers may number in the tens of thousands or greater. The plurality of servers 108 is not limited to large sets of servers. The plurality of servers 108 may include a small number of servers as well.

Figure 3:
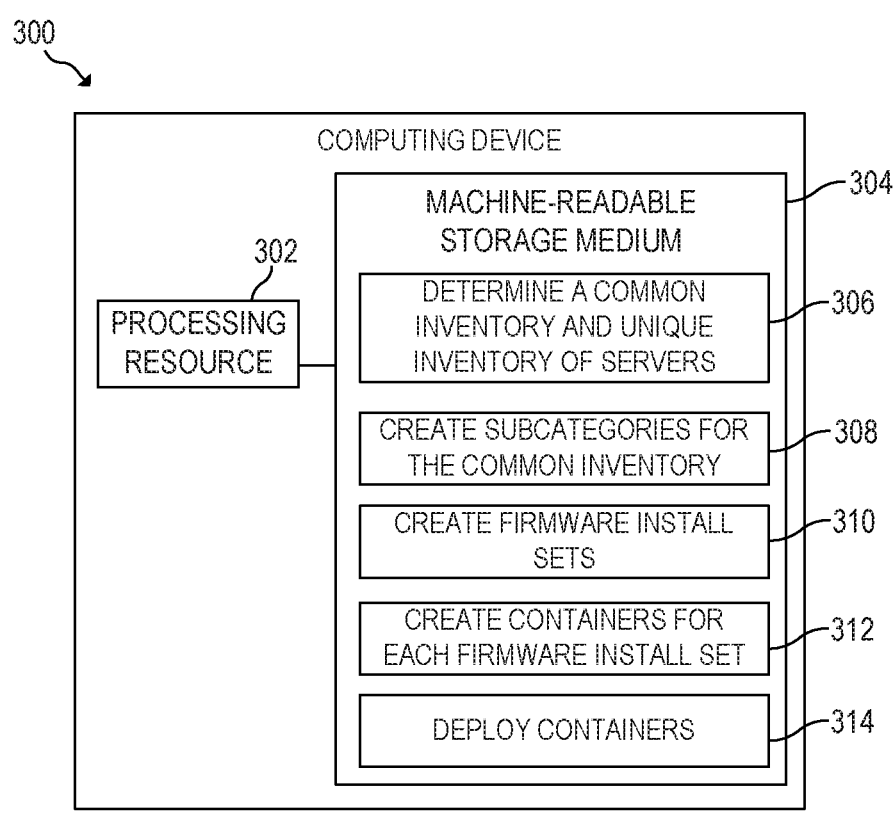
FIG. 3 is a block diagram of a computing device capable of determining an inventory, creating subcategories, creating firmware install sets, and creating and deploying containers.

FIG. 3 is a block diagram of a computing device 300 capable of determining an inventory, creating subcategories, creating firmware install sets, and creating and deploying containers. The computing device 300 may include a processing resource 302 and machine-readable storage medium 304. The processing resource 302 may execute instructions included in the machine-readable storage medium 304. The machine-readable storage medium 304 may include instructions 306 to determine a common inventory and unique inventory of a plurality of servers. The instructions 306 may, when executed, gather the fingerprints of a plurality of servers. For the common fingerprint, the inventory may be taken for one server, as the components across servers with a common fingerprint may be the same. For the unique fingerprint, inventory may be taken per server as the components for each of the unique servers may be different. In an example, some servers may include multiple fingerprints. In further examples, a server may include both common fingerprints and unique fingerprints. In such examples, the common fingerprint may identify certain common components of the server. The computing device 300 may skip inventory for those particular components if an inventory for those particular components has already been taken. The unique fingerprint may identify unique or non-standard components. The computing device may take inventory of those components, noting the component, the firmware installed that is associated with the component, and the installed firmware version.

The machine-readable storage medium 304 may include instructions 308 to create subcategories. As noted above, a common inventory may include several different components. The components may be broken down further according to various factors. These factors are described above.

The machine-readable storage medium 304 may include instructions 310 to create firmware install sets. The install sets may be based on available firmware updates. The install sets may also be based on the inventories taken from the servers. For example, one install set may include firmware updates for a subcategory of a common inventory, while another install set may include firmware updates for a unique inventory.

The machine-readable storage medium 304 may include instructions 312 to create containers. As described above, containers may be used to store the updates for a set of servers. The computing device 300 may create containers upon determining an install set. The computing device 300 may create containers for firmware updates when the updates are available.

The machine-readable storage medium 304 may include instructions 314 to deploy the containers to servers of a plurality of servers. Which server the computing device 300 deploys the container to may be based on various factors (described above), such as physical location of the servers to be updated or the amount of servers to be updated.

Although the flow diagram of FIG. 2 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims

What is claimed is:

1. A method of a system comprising a hardware processor, comprising:
   determining an inventory of a plurality of servers based on unique fingerprints and a common fingerprint, wherein the determining comprises grouping servers that share the common fingerprint into a group, and wherein the common fingerprint is a value based on components present in a server of the group;
   creating a common set of installed firmware for the servers in the group, and creating unique sets of installed firmware for servers having the unique fingerprints;
   subcategorizing the common set of installed firmware, the subcategorizing creating subcategory sets of installed firmware based on categories of components included in the servers of the group that share the common fingerprint;
   obtaining updated versions of firmware corresponding to the subcategory sets of installed firmware and the unique sets of installed firmware;
   in response to an update request:
      creating a plurality of containers comprising first containers including the updated versions of firmware corresponding to the subcategory sets of installed firmware, and second containers including the updated versions of firmware corresponding to the unique sets of installed firmware, wherein each container of the plurality of containers is executable as a virtualized isolated process,
      deploying the plurality of containers to a set of servers of the plurality of servers, based on locations of servers to be updated, a network topology, and server workloads, and
      sending update messages to the servers to be updated, the update messages including links to respective containers of the plurality of containers.

2. The method of claim 1, wherein the common set of installed firmware includes firmware components, drivers, and applications executable on a processor.

3. The method of claim 1, wherein the subcategory sets of installed firmware comprise firmware for a baseboard management controller (BMC).

4. The method of claim 1, wherein the deploying of the plurality of containers comprises:
   determining whether the servers of the group that share the common fingerprint are located in a same data center,
   in response to determining that the servers of the group are located in the same data center, selecting a server of the group at which to host a given container of the first containers, and
   deploy the given container to the selected server.

5. The method of claim 1, further comprising:
   in response to a notification of a hardware change at a given server of the plurality of servers, re-determining the inventory of the plurality of servers, wherein the notification of the hardware change is from a baseboard management controller (BMC) of the given server over a management network.

6. The method of claim 1, further comprising:
   in response to a hardware change to a given server of the plurality of servers, determining whether a security event occurred, wherein a notification of the hardware change is from a baseboard management controller (BMC) of the given server over a management network.

7. A system comprising:
   a processor; and
   a non-transitory machine-readable storage medium storing instructions executable on the processor to:
      determine an inventory of a plurality of servers based on unique fingerprints and a common fingerprint, wherein the determining comprises grouping servers that share the common fingerprint into a group, and wherein the common fingerprint is a value based on components present in a server of the group;
      based on firmware updates available in the non-transitory machine-readable storage medium, determine a common install set for the servers in the group, and determine unique install sets for servers having the unique fingerprints;
      determine, in response to a signal from a baseboard management controller (BMC) of a server of the plurality of servers, whether an unauthorized firmware update has occurred;
      in response to a determination that the unauthorized firmware update has occurred, downgrade the unauthorized firmware update to a last known good version, based on the common fingerprint and the unique fingerprints;
      stage the common install set and the unique install sets in an order based in part on the common fingerprint, the unique fingerprints, and a topology of the plurality of servers; and
      deploy the common install set and the unique install sets according to the order.

8. The system of claim 7, wherein the instructions are executable on the processor to:
   subcategorize the common install set, the subcategorizing creating subcategory install sets based on categories of components included in the servers of the group that share the common fingerprint, wherein each subcategory install set of the subcategory install sets comprises firmware components.

9. The system of claim 7, wherein the staging is based on potential downtime due to the firmware updates.

10. The system of claim 7, wherein the common fingerprint is updated responsive to a hardware component being added to a server of the group.

11. The system of claim 7, wherein the instructions are executable on the processor to:
   receive a notification from a baseboard management controller (BMC) of a given server of the plurality of servers, the notification responsive to a removal of a component in the given server.

12. The system of claim 11, wherein the notification is a security notification.

13. The system of claim 11, wherein the instructions are executable on the processor to, in response to the notification, update the inventory of the plurality of servers, and update a fingerprint associated with the given server.

14. The system of claim 8, wherein the instructions are executable on the processor to:
   create a plurality of containers comprising first containers including updated firmware of the subcategory install sets, and second containers including updated firmware of the unique install sets, wherein each container of the plurality of containers is executable as a virtualized isolated process,
   wherein the deploying of the common install set and the unique install sets comprises deploying the plurality of containers to a set of servers of the plurality of servers.

15. The system of claim 7, wherein the instructions are executable on the processor to obtain the firmware updates automatically at a specified time interval from a web server.

16. A non-transitory machine-readable storage medium comprising instructions that upon execution cause a system to:
- determine an inventory of a plurality of servers based on a common fingerprint for a group of servers, and based on unique fingerprints for unique servers, wherein the determining comprises grouping the servers that share the common fingerprint into the group, and wherein the common fingerprint is a value based on components present in a server of the group;
- create a common set of firmware for the servers in the group, and create unique sets of firmware for unique servers having the unique fingerprints;
- subcategorize the common set of firmware, the subcategorizing creating subcategory sets of firmware based on categories of components included in the servers of the group that share the common fingerprint;
- create a plurality of containers comprising first containers including updated firmware of the subcategory sets of firmware, and second containers including updated versions of firmware corresponding to the unique sets of firmware, wherein each container of the plurality of containers is executable as a virtualized isolated process;
- deploy the plurality of containers to a set of servers of the plurality of servers based on a number of firmware updates, a number of the servers in the group, a number of the unique servers, and a topology of the plurality of servers; and
- in response to a reception of an update notification, send, to servers to be updated, links to respective containers of the plurality of containers.

17. The non-transitory machine-readable storage medium of claim 16, further comprising instructions that upon execution cause the system to receive a notification from a baseboard management controller (BMC) in response to a removal of a hardware component of a server of the plurality of servers.

18. The non-transitory machine-readable storage medium of claim 16, further comprising instructions that upon execution cause the system to:
- determine, in response to a signal from a baseboard management controller (BMC) of a server of the plurality of servers, whether an unauthorized firmware update has occurred; and
- in response to a determination that the unauthorized firmware update has occurred, downgrade the unauthorized firmware update to a last known good version, based on the common fingerprint and the unique fingerprints.

19. The non-transitory machine-readable storage medium of claim 18, further comprising instructions that upon execution cause the system to update the common fingerprint responsive to a hardware component being added to a server of the group.

20. The method of claim 1, further comprising:
- determining, in response to a signal from a baseboard management controller (BMC) of a server of the plurality of servers, whether an unauthorized firmware update has occurred; and
- in response to a determination that the unauthorized firmware update has occurred, downgrading the unauthorized firmware update to a last known good version, based on the common fingerprint and the unique fingerprints.

* * * * *